US 9,400,530 B2

(12) United States Patent
Hara et al.

(10) Patent No.: US 9,400,530 B2
(45) Date of Patent: Jul. 26, 2016

(54) ELECTRONIC APPARATUS AND MEMBER ROTATING OPERATION METHOD

(71) Applicant: FUJITSU LIMITED, Kawasaki-shi, Kanagawa (JP)

(72) Inventors: Noritaka Hara, Kamakura (JP); Ushio Oshima, Nakano (JP)

(73) Assignee: FUJITSU LIMITED, Kawasaki (JP)

( * ) Notice: Subject to any disclaimer, the term of this patent is extended or adjusted under 35 U.S.C. 154(b) by 241 days.

(21) Appl. No.: 14/095,109

(22) Filed: Dec. 3, 2013

(65) Prior Publication Data

US 2014/0293517 A1     Oct. 2, 2014

(30) Foreign Application Priority Data

Mar. 27, 2013   (JP) .................................. 2013-066877

(51) Int. Cl.
*G06F 1/16*    (2006.01)
*G06F 1/18*    (2006.01)

(52) U.S. Cl.
CPC *G06F 1/183* (2013.01); *G06F 1/16* (2013.01); *Y10T 29/49815* (2015.01)

(58) Field of Classification Search
CPC ..... H05K 5/0217; H05K 5/0204; H05K 7/14; H05K 7/1489; H05K 1/181; G06F 1/16; G06F 1/1601; G06F 1/187; G06F 1/183; Y10T 29/49815
USPC .......... 361/679.02, 679.33–679.39, 724–727; 312/223.1–223.2; 29/426.1
See application file for complete search history.

(56) References Cited

U.S. PATENT DOCUMENTS

| 6,388,876 | B1 * | 5/2002 | Chen ....................... | G06F 1/184 |
| | | | | 312/223.2 |
| 6,751,100 | B2 * | 6/2004 | Chen ....................... | G06F 1/181 |
| | | | | 312/223.1 |
| 7,990,697 | B2 * | 8/2011 | Yeh ......................... | G06F 1/187 |
| | | | | 361/679.33 |
| 2005/0068720 | A1 * | 3/2005 | Lambert ................. | G06F 1/187 |
| | | | | 361/679.03 |

FOREIGN PATENT DOCUMENTS

JP      60-167377 A      8/1985
JP      03-135775 A      6/1991

* cited by examiner

*Primary Examiner* — Anthony Haughton
*Assistant Examiner* — Ingrid Wright
(74) *Attorney, Agent, or Firm* — Westerman, Hattori, Daniels & Adrian, LLP

(57) ABSTRACT

An electronic apparatus includes: a housing; a mounting member pivotably mounted to the housing; a displacing member including an L-shaped shaft hole formed in at least one of the mounting member and the housing member, and a shaft located in the shaft hole; the displacing member be configured such that the shaft is located at a first position of the L-shaped shaft hole when the mounting member is in a falling position and the shaft is located at a second position of the L-shaped shaft hole different from the first position when the mounting member is in an erected position; and a rotation suppressing member configured to hold the mounting member when the mounting member is displaced, and suppress the rotation of the mounting member.

15 Claims, 12 Drawing Sheets

ELECTRONIC APPARATUS AND MEMBER ROTATING OPERATION METHOD

CROSS-REFERENCE TO RELATED APPLICATION

This application is based upon and claims the benefit of priority from the prior Japanese Patent Application No. 2013-066877 filed on Mar. 27, 2013, the entire contents of which are incorporated herein by reference.

FIELD

Embodiments relate to an electronic apparatus and a member rotating operation method.

BACKGROUND

When a counter shaft of a member that is pivotably mounted on a body of an apparatus fits into a groove formed in the body of the apparatus, a cover plate is substantially vertically held.

A related technology is disclosed in Japanese Laid-open Patent Publication No. 3-135775.

SUMMARY

According to one aspect of the embodiments, an electronic apparatus includes: a housing; a mounting member pivotably mounted to the housing; a displacing member including an L-shaped shaft hole formed in at least one of the mounting member and the housing member, and a shaft located in the shaft hole; the displacing member be configured such that the shaft is located at a first position of the L-shaped shaft hole when the mounting member is in a falling position and the shaft is located at a second position of the L-shaped shaft hole different from the first position when the mounting member is in an erected position; and a rotation suppressing member configured to hold the mounting member when the mounting member is displaced, and suppress the rotation of the mounting member.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

When a support member that is pivotable with respect to a housing is rotated and held at a certain angle to restrain the rotation, it is desired to improve the workability of working.

Figure 1:
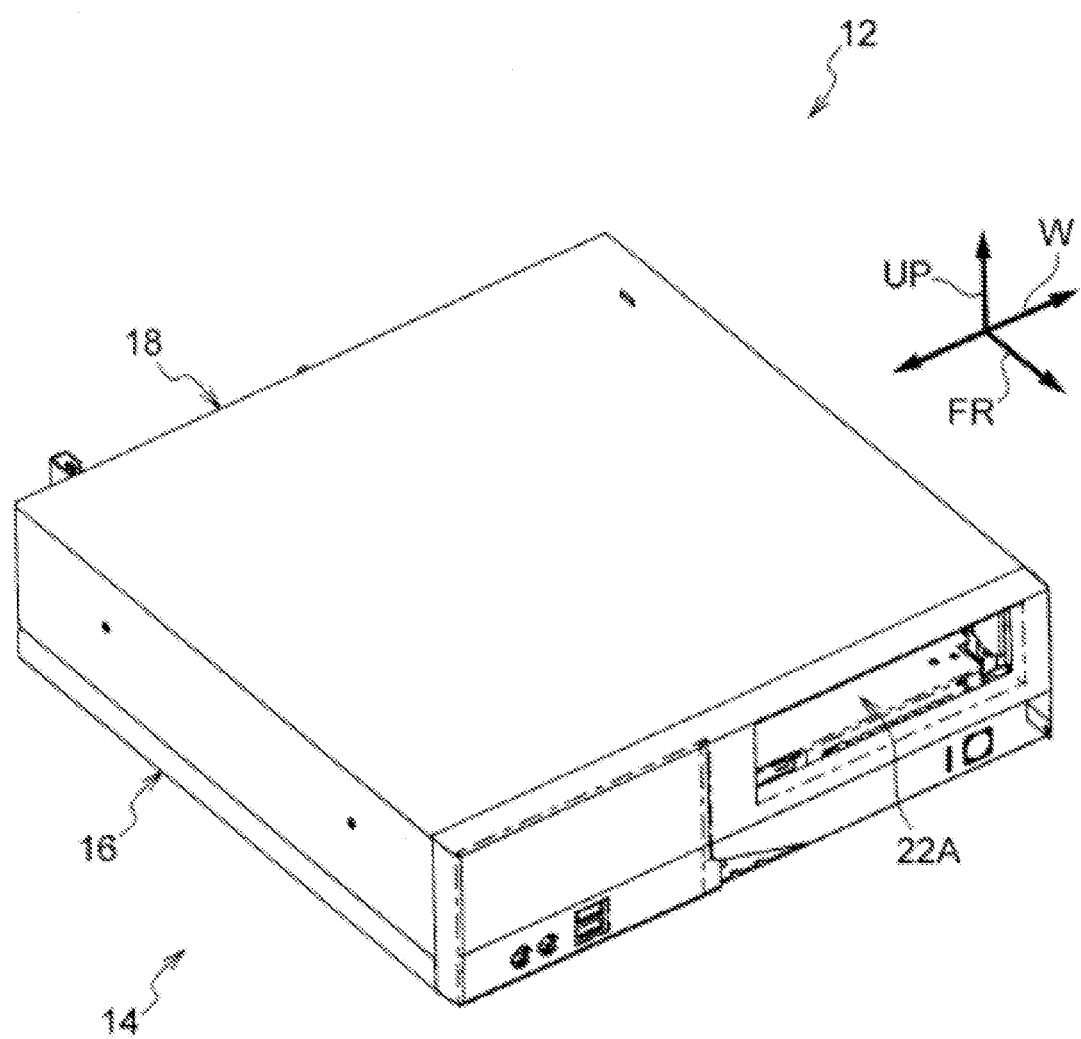
FIG. 1 illustrates an example of a computer.
Figure 2:
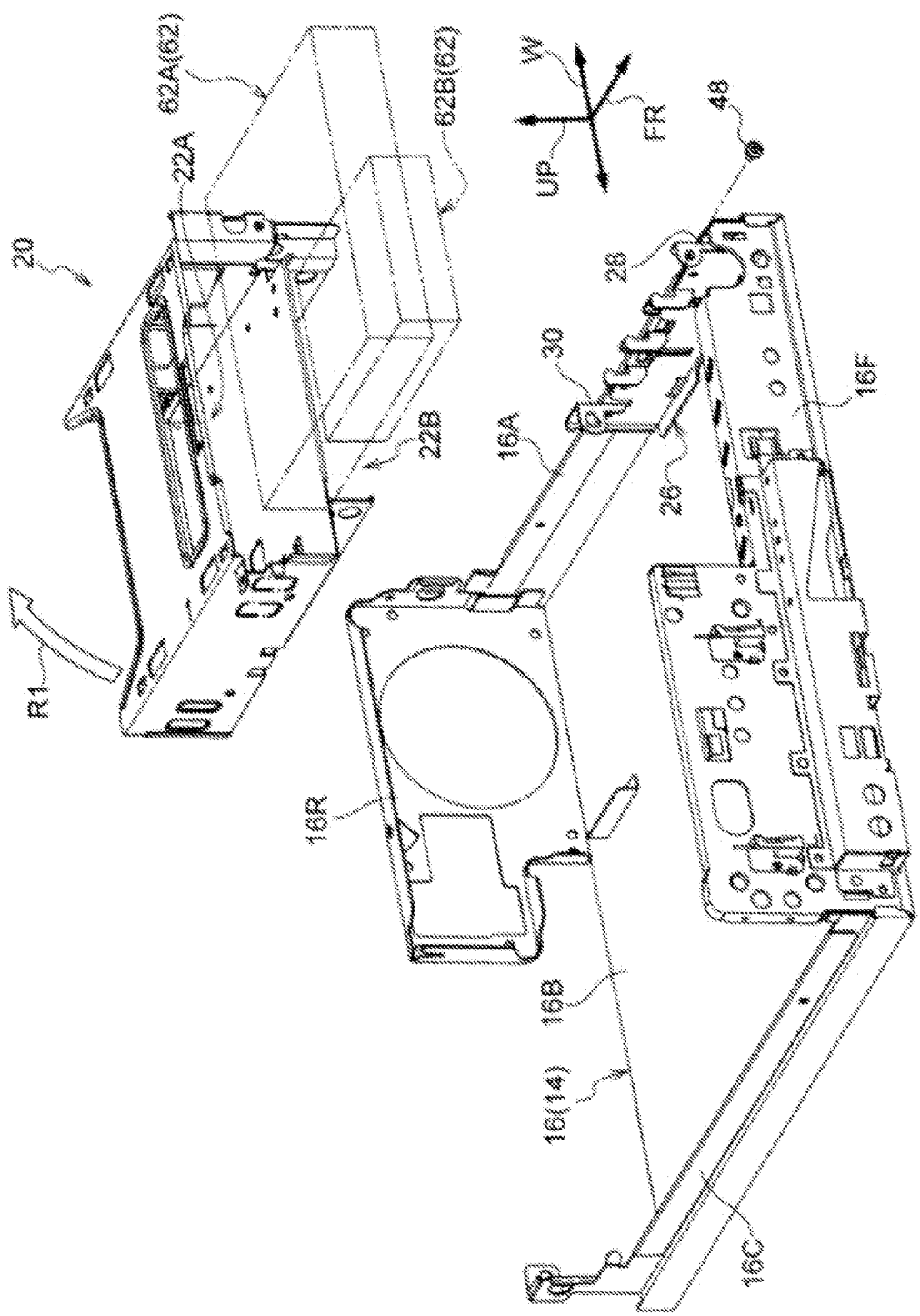
FIG. 2 is an exploded perspective view of a computer.

FIG. 1 illustrates an example of a computer. FIG. 2 is an exploded perspective view of a computer. The computer may be an electronic apparatus. External devices such as input/output devices and storage units and a communication line are coupled to a computer body 12 as desired.

The computer body 12 includes a housing 14. The housing 14 includes a housing body 16 having a bottom wall 16B, a front wall 16F, a rear wall 16R, and side walls 16A and 16C, and includes a cover 18 that covers the housing body 16.

In descriptions below, the "front side" and "rear side" are respectively the front side (indicted by the arrow FR) and the rear side (opposite to the side indicated by the arrow FR) with respect to the housing 14. The "front-and-rear direction", "upper direction", and "width direction" are the front-and-rear direction, upper direction (indicated by the arrow UP), and width direction (indicated by the arrow W) with respect to the housing 14.

Although, in FIGS. 1 to 12, the computer body 12 is placed such that the width direction is aligned with a horizontal direction (placed sideways), the computer body 12 may be placed such that the width direction is aligned with the vertical direction (placed upright) according to the usage status. The width direction and front-and-rear direction of individual structures may be interchanged (the structures may be oriented in a direction rotated by 90 degrees) depending on the structure of the computer body 12.

A mounting member 20 is mounted on the housing body 16 so as to be pivotable between a falling position (see FIGS. 8A, 8B, and 8C) and an erected position (see FIGS. 11A, 11B, and 11C) with respect to the housing 14. In FIGS. 2, 8A, 8B, and 8C, the arrow R1 indicates the direction in which the mounting member 20 is rotated from the falling position to the erected position.

An attachment unit 22 is provided in the mounting member 20. A mounted member 62 to be mounted in the computer body 12 is attached to the attachment unit 22. The mounted member 62 may include, for example, an optical disk drive 62A and a hard disk drive 62B. The mounting member 20 has an attachment unit 22A, in which the optical disk drive 62A is attached, and an attachment unit 22B, in which the hard disk drive 62B is attached. The mounted member 62 attached to the mounting member 20 is not limited to the optical disk drive 62A and hard disk drive 62B.

A fixing piece 26 is secured to the side wall 16A on one side of the housing body 16 with a fastener or the like. The fixing piece 26, which is made of a metal plate, is formed into a desired form by making a slit at certain position of a metal plate, bending the metal plate, and machining such as perforating the metal plate. In machining on the metal plate, pressing, cutting, punching, laser beam irradiation, and the like may be appropriately combined. The fixing piece 26 is positioned so that a body 26A is oriented in the front-and-rear direction of the housing 14.

Figure 3:
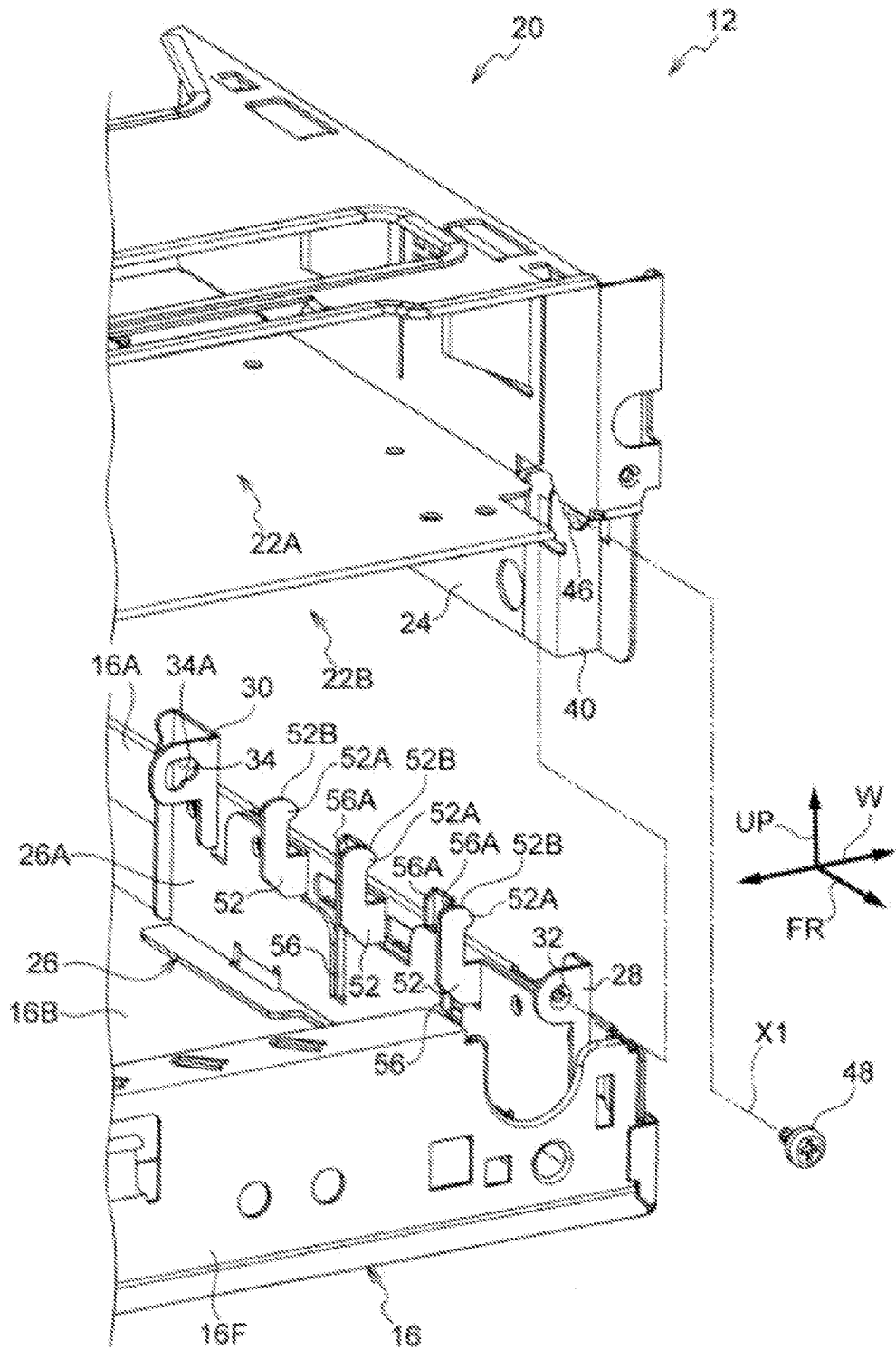
FIG. 3 is an exploded perspective view of a housing and a mounting member of a computer.
Figure 4:
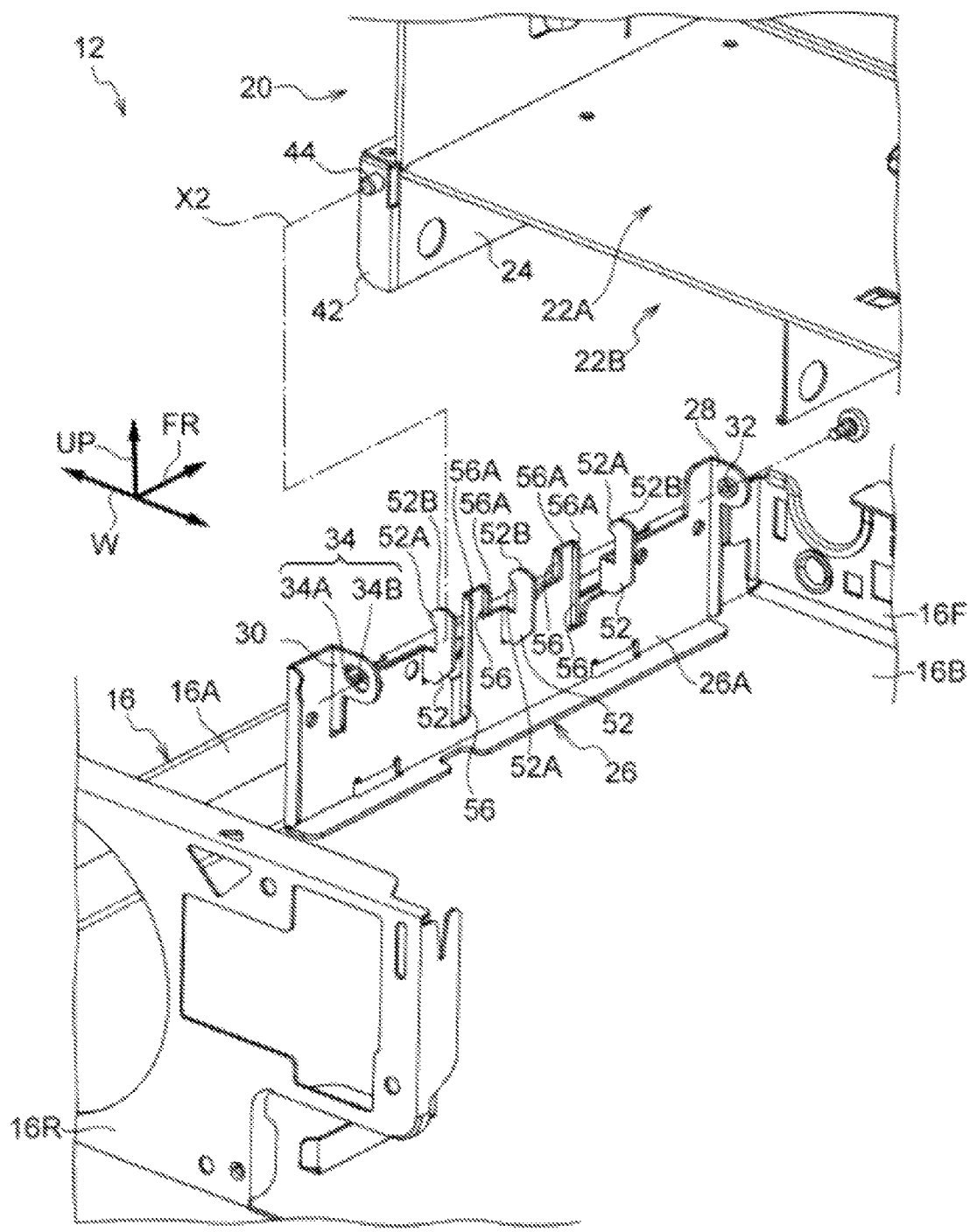
FIG. 4 is an exploded perspective view of a housing and a mounting member of the computer.
Figure 5:
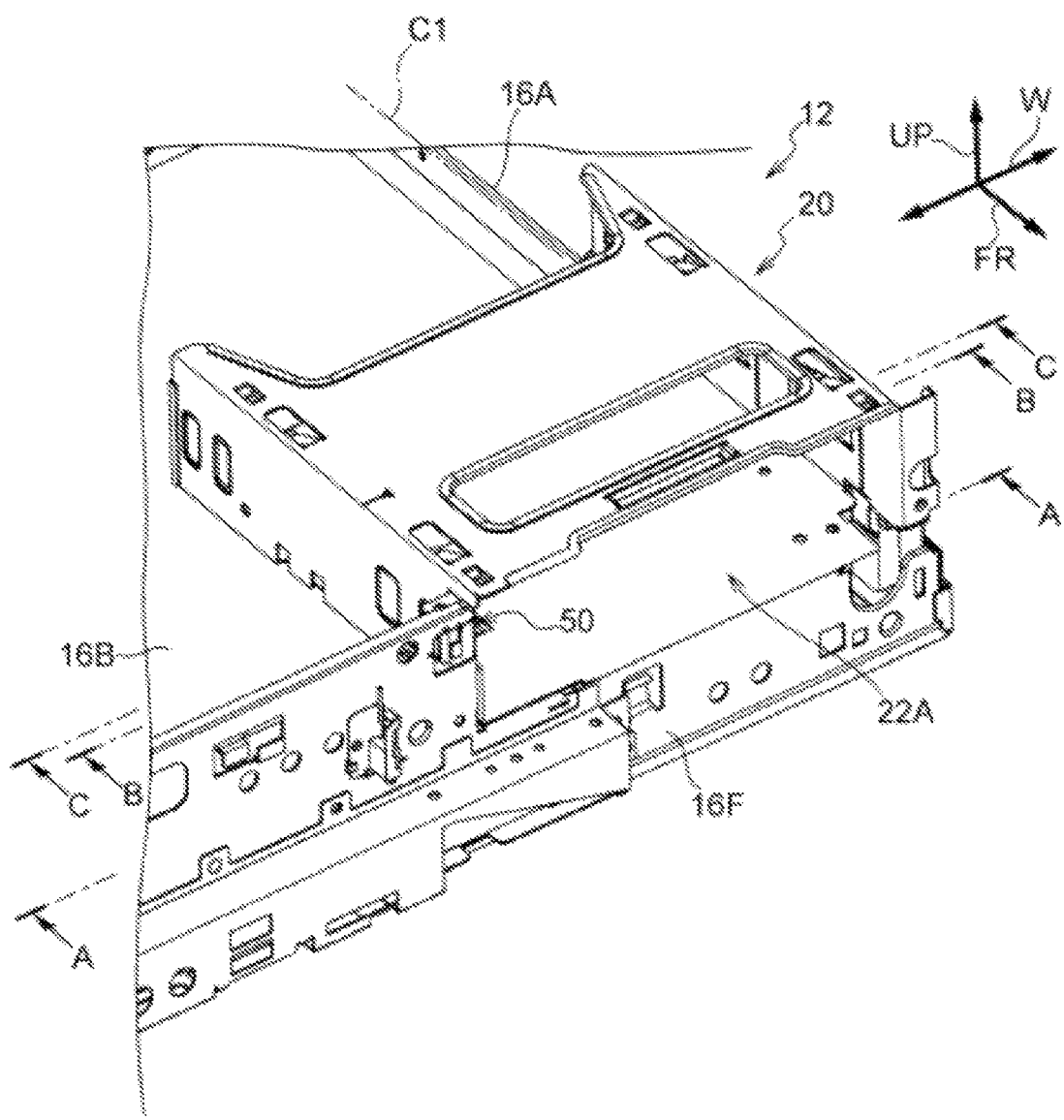
FIG. 5 is an exploded perspective view of a housing and a mounting member of a computer.

FIGS. 3, 4, and 5 are exploded perspective views of a housing and mounting member of a computer. As illustrated in FIGS. 3 and 4, holding plates 28 and 30, which are formed by bending the metal plate of the body 26A in the width direction of the housing 14, are respectively formed on the front side and rear side of the fixing piece 26. Holding holes 32 and 34 are respectively formed at the top of the holding plates 28 and 30 to pass through the holding plates 28 and 30 in the thickness direction, for example, a direction aligned with the front-and-rear direction of the housing 14.

The holding hole 32 in the holding plate 28 on the front side is formed in a perfect circular shape and has a female screw in its inner circumference.

The holding hole 34 in the holding plate 30 on the rear side is substantially L-shaped and has a horizontal part 34A which is a long hole extending in the width direction, and a vertical part 34B which is formed long on the side wall 16A side to extend downward from the horizontal part 34A.

Figure 6:
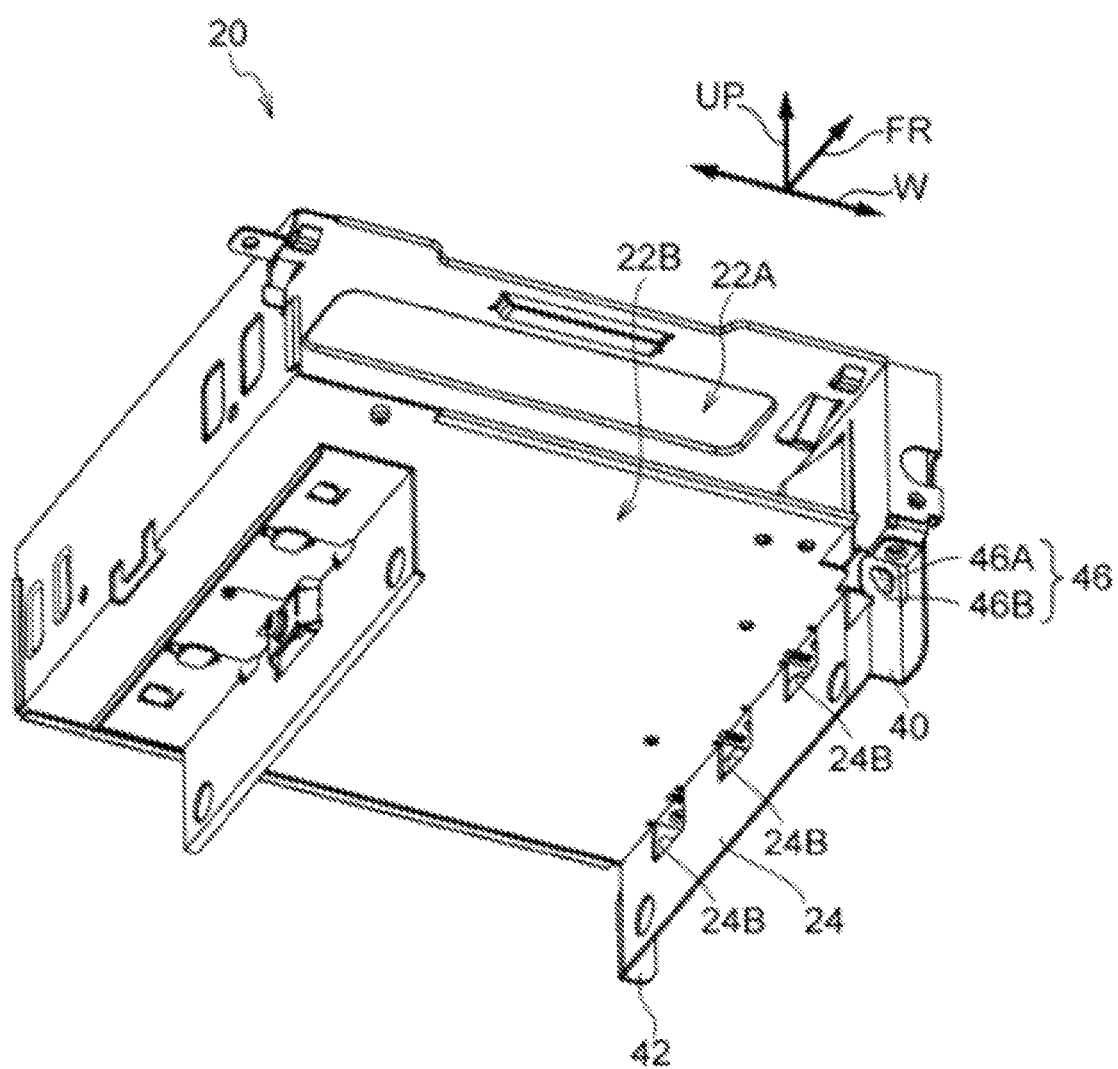
FIG. 6 is a perspective view of a mounting member of a computer.
Figure 7:
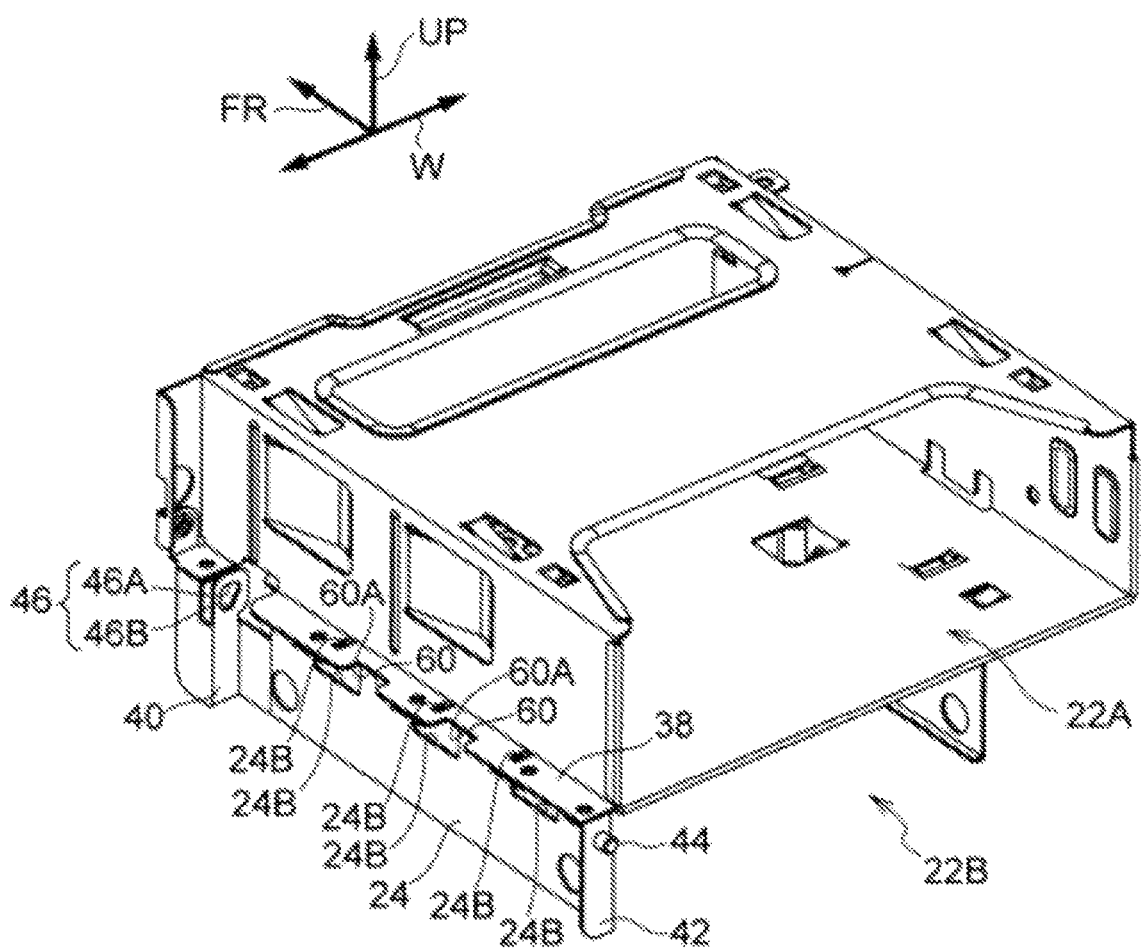
FIG. 7 is a perspective view of a mounting member of a computer.

FIGS. 6 and 7 are perspective views of a mounting member of a computer. As illustrated in FIGS. 6 and 7, a side plate 24 is formed on the side wall 16A side of the mounting member 20 to extend downward. In the front-and-rear direction, the length of the side plate 24 is substantially the same as the length of the mounting member 20. The side plate 24 has an upper plate 38 extending in the front-and-rear direction at the top, and has a front plate 40 and a rear plate 42 respectively extending from the front end and the rear end in the width direction.

A support shaft 44 is formed at an upper portion of the rear plate 42 and extends toward the rear side. As illustrated in FIG. 4, the support shaft 44 is inserted into the holding hole 34 from the front side.

A shaft hole 46, which passes through the front plate 40 in its thickness direction, is formed at an upper portion of the front plate 40. The shaft hole 46 is substantially L-shaped and has a horizontal part 46A which is a long hole extending in the width direction, with the mounting member 20 in the falling state, and a vertical part 46B, which is formed long on the side wall 16A side to extend downward from the horizontal part 46A.

With the shaft hole 46 and holding hole 32 aligned, a shaft screw 48 is inserted into the shaft hole 46 and is screwed in the female screw of the holding hole 32, as illustrated in FIG. 3. In this state, the axial line X1 (see FIG. 3) of the shaft screw 48 is aligned with the axial line X2 (see FIG. 4) of the support shaft 44. For example, the mounting member 20 is mounted by the support shaft 44 on the rear side and by the shaft screw 48 on the front side so as to be pivotable around a rotation center line C1 (see FIG. 5) with respect to the housing 14. The support shaft 44 and shaft screw 48 may be a pivot shaft of the mounting member 20.

The shaft screw 48 may be, for example, a shoulder screw; an amount by which the shaft screw 48 is screwed in the holding hole 32 may be restricted within a certain range. Accordingly, a clearance equal to or larger than the thickness of the front plate 40 is left between the holding plate 28 and the head of the shaft screw 48, and undesirable resistance against the rotation of the mounting member 20 may not be caused.

The housing 14 has a clamping part 50 that partially clamps the mounting member 20 positioned at the falling position to restrain undesirable rotation of the mounting member 20. When the mounting member 20 is pulled up toward the erected position against the clamping force of the clamping part 50, the mounting member 20 may be unclamped. With the clamping part 50 in an unclamped state, the mounting member 20 becomes pivotable toward the erected position.

Figure 8A:
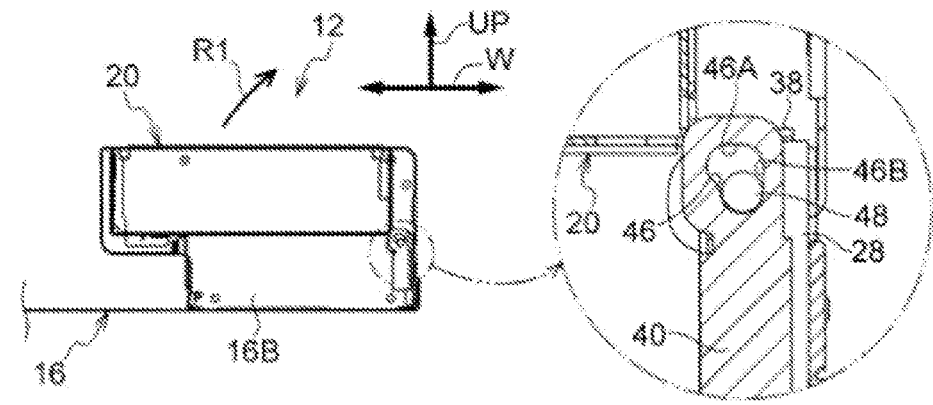
FIG. 8A is an A-A line cross sectional view when a mounting member is at a falling position.
Figure 8B:
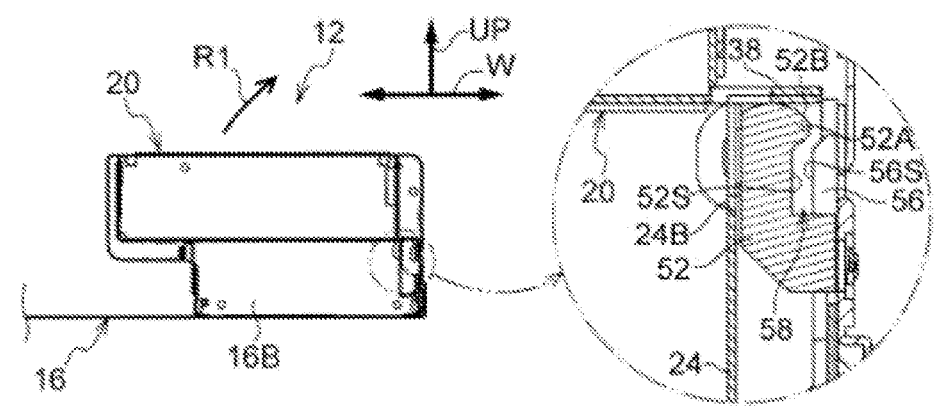
FIG. 8B is a B-B line cross sectional view when a mounting member is at the falling position.
Figure 8C:
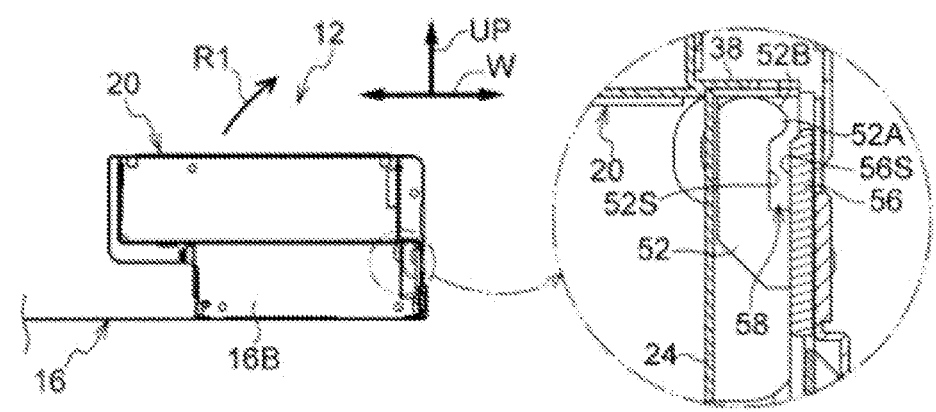
FIG. 8C is a C-C line cross sectional view when a mounting member is at the falling position.

FIG. 8A is an A-A line cross sectional view when a mounting member is at the falling position. FIG. 8B is a B-B line cross sectional view when the mounting member is at the falling position. FIG. 8C is a C-C line cross sectional view when the mounting member is at the falling position. A-A line, B-B line, and C-C line are indicated in FIG. 5. As illustrated in FIG. 8A, when the mounting member 20 is at the falling position, the shaft hole 46 is positioned at the bottom of the vertical part 46B with respect to the shaft screw 48 as illustrated in FIG. 8A; for example, the shaft hole 46 is positioned at a high position relative to the position of the shaft screw 48. At the horizontal part 34A, the support shaft 44 is positioned on the side wall 16A side. When the mounting member 20 is supported by, for example, a curved support edge 52B, a state may be maintained in which the shaft screw 48 is positioned at the bottom of the vertical part 46B and the support shaft 44 is positioned in the horizontal part 34A on the side wall 16A side.

As illustrated in FIGS. 3 and 4, the fixing piece 26 has one or a plurality of support pieces 52. Three support pieces 52 are formed with a space between each two support pieces 52 in the front-and-rear direction. The support piece 52 may be an example of a support member.

The top of each support piece 52 is a wide portion 52A, which is wide toward the side wall 16A. The upper end of the wide portion 52A is the curved support edge 52B, which is curved to have an upward convex. The curved support edge 52B is curved so that when the mounting member 20 is rotated from the falling position toward the erected position, the curved support edge 52B supports the upper plate 38 of the mounting member 20 from below to guide the rotation of the mounting member 20 until an intermediate position in the rotation is reached.

Figure 9A:
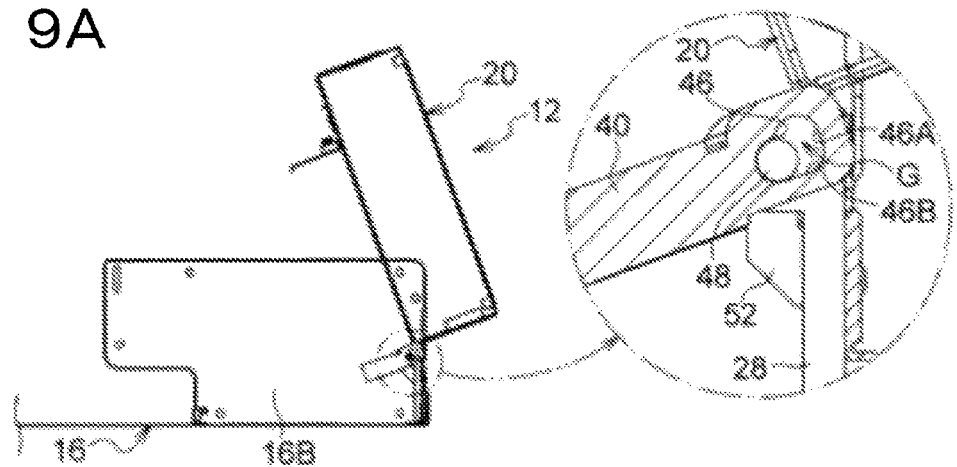
FIG. 9A is an A-A line cross sectional view when a mounting member is rotated.
Figure 9B:
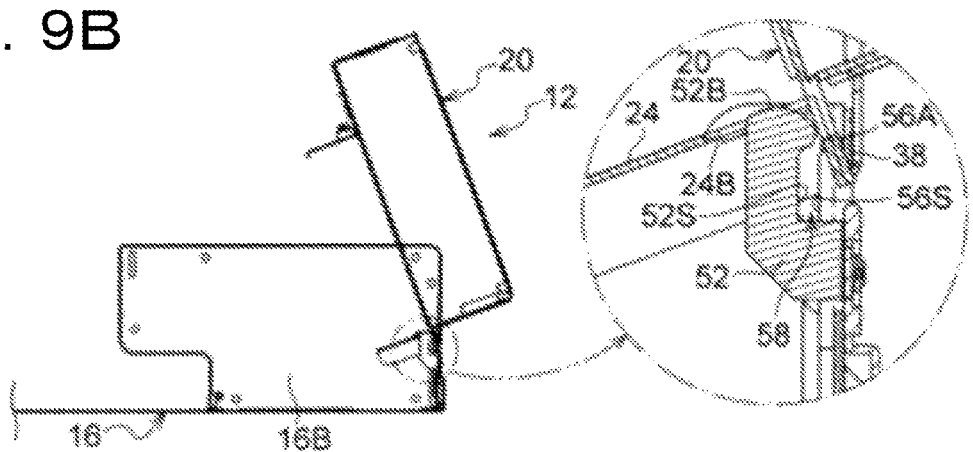
FIG. 9B is a B-B line cross sectional view when a mounting member is rotated.
Figure 9C:
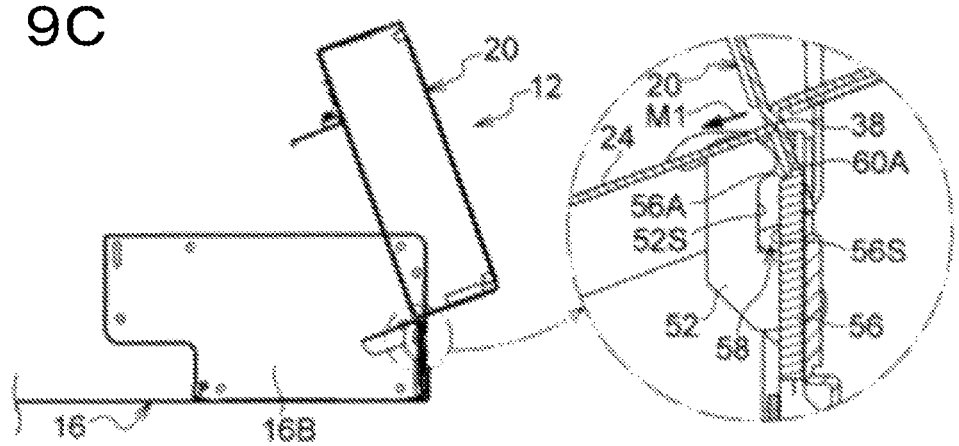
FIG. 9C is a C-C line cross sectional view when a mounting member is rotated.

Grooves 24B are formed in the side plate 24 and upper plate 38 of the mounting member 20 at positions corresponding to the curved support edges 52B in the front-and-rear direction. FIG. 9A is an A-A line cross sectional view when a mounting member is rotated. FIG. 9B is a B-B line cross sectional view when a mounting member is rotated. FIG. 9C is a C-C line cross sectional view when a mounting member is rotated. A-A line, B-B line, and C-C line are indicated in FIG. 5. When the mounting member 20 is rotated from the falling position toward the erected position, the grooves 24B are displaced toward the outside in the width direction until a rotation angle reaches a certain angle (see FIGS. 9A, 9B, and 9C). Therefore, the mounting member 20 may be supported at the side plate 24 and upper plate 38 by the curved support edges 52B, and the downward motion of the mounting member 20 may be restricted. A state is maintained in which the shaft hole 46 is positioned at the bottom of the vertical part 46B with respect to the shaft screw 48 and the shaft screw 48 is positioned at the bottom of the vertical part 46B.

If the rotation angle to the erected position of the mounting member 20 exceeds the above certain angle, the grooves 24B move toward the inside in the width direction and reach the top of the curved support edges 52B. The curved support edges 52B are placed in the grooves 24B and no longer support the mounting member 20. This position at which the mounting member 20 is not supported may be referred to as a support cancel position.

Figure 10A:
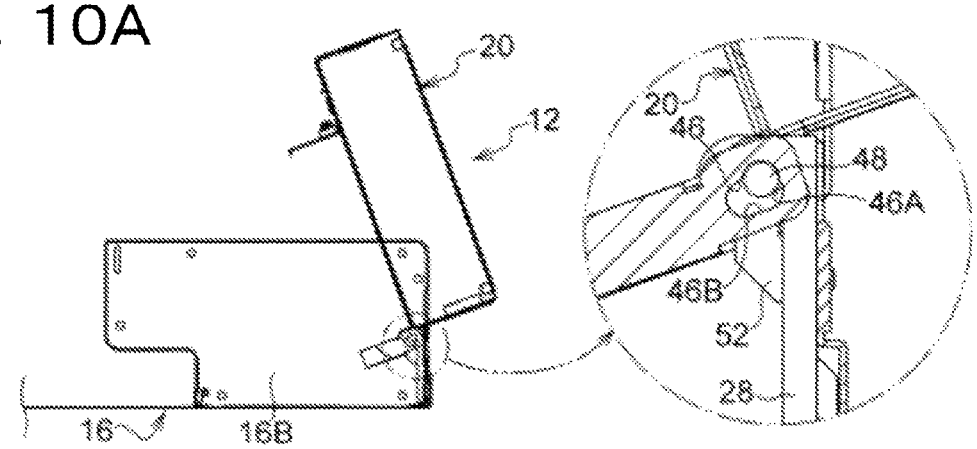
FIG. 10A is an A-A line cross sectional view when a mounting member is rotated.
Figure 10B:
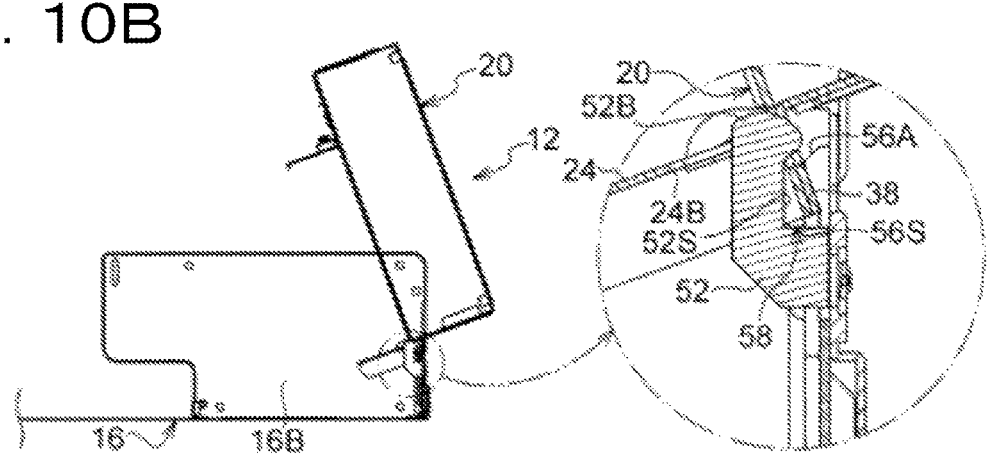
FIG. 10B is a B-B line cross sectional view when a mounting member is rotated.
Figure 10C:
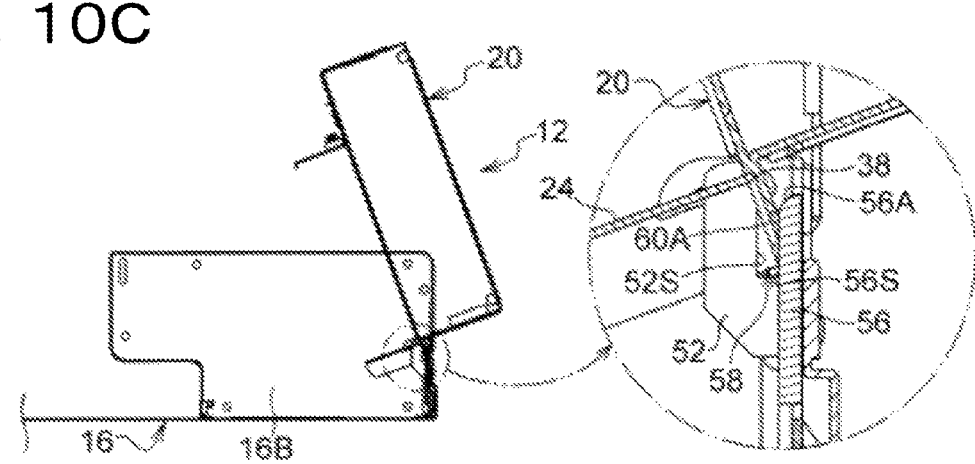
FIG. 10C is a C-C line cross sectional view when a mounting member is rotated.

As illustrated in FIG. 9A, the shaft screw 48 is positioned at the top end of the horizontal part 46A, which is inclined in this state, and there is a clearance G between the shaft hole 46 and the top of the shaft screw 48. The support shaft 44 is positioned on a boundary between the horizontal part 34A and the vertical part 34B, and there is a clearance between the holding hole 34 and the bottom of the support shaft 44. FIG. 10A is an A-A line cross sectional view when a mounting member is rotated. FIG. 10B is a B-B line cross sectional view when the mounting member is rotated. FIG. 10C is a C-C line cross sectional view when the mounting member is rotated. A-A line, B-B line, and C-C line are indicated in FIG. 5. As illustrated in, for example, FIGS. 10B and 10C, the curved support edges 52B do not support the mounting member 20 (the side plate 24 and upper plate 38). Accordingly, the mounting member 20 is able to be displaced downward. If the mounting member 20 is at, for example, the erected position, the mounting member 20 may be displaced in a direction crossing the rotation center line C1, for example, in a downward direction orthogonal to the rotation center line C1.

The holding hole 32 and shaft hole 46 may be an example of an accommodating hole. When the mounting member 20 is at the erected position, the shaft screw 48 and holding hole 32, and the support shaft 44 and shaft hole 46 may be displaced in a direction crossing the rotation center line C1, for example, in a direction orthogonal to the rotation center line C1, and may be an example of a displacing member.

The fixing piece 26 has one or a plurality of guide pieces 56. For example, four guide pieces 56 may be formed with a space between the guide pieces 56 in the front-and-rear direction.

The guide piece 56 and support piece 52 are displaced in the front-and-rear direction. As illustrated in FIGS. 8B and 8C, when the fixing piece 26 is viewed in the front-and-rear direction, a retaining part 58, which is slightly wider than the thickness of the upper plate 38 in the width direction, is formed between a widthwise inner side 56S of the guide piece 56 and a widthwise outer side 52S of the support piece 52. The positions and shapes of the guide piece 56 and support piece 52 are determined so that the retaining part 58, which is slightly wider than the thickness of the upper plate 38, is formed, for example, between the guide piece 56 and the support piece 52.

Figure 11A:
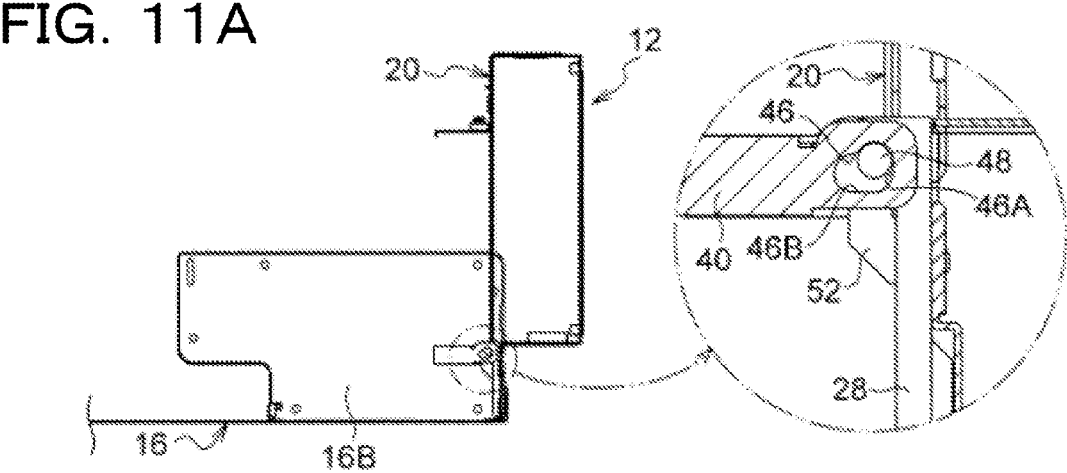
FIG. 11A is an A-A line cross sectional view when a mounting member is at an erected position.
Figure 11B:
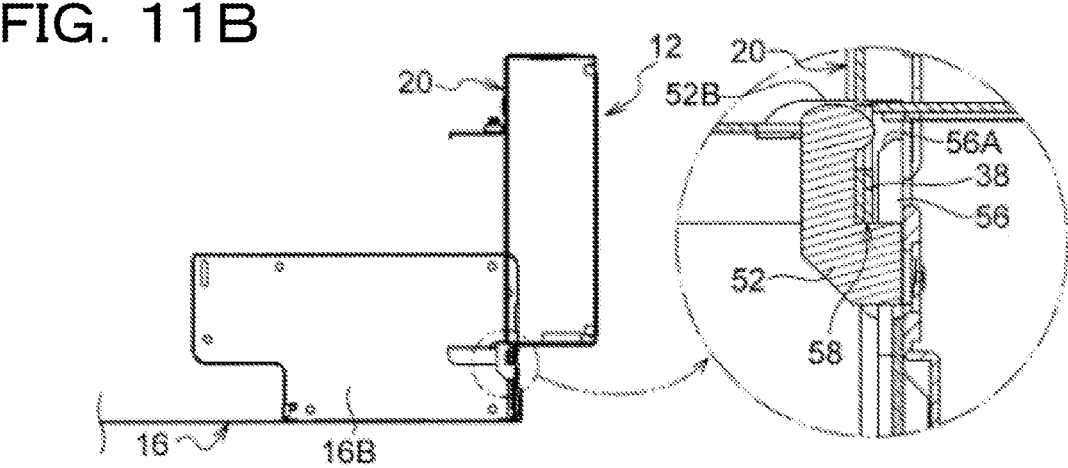
FIG. 11B is a B-B line cross sectional view when a mounting member is at an erected position.
Figure 11C:
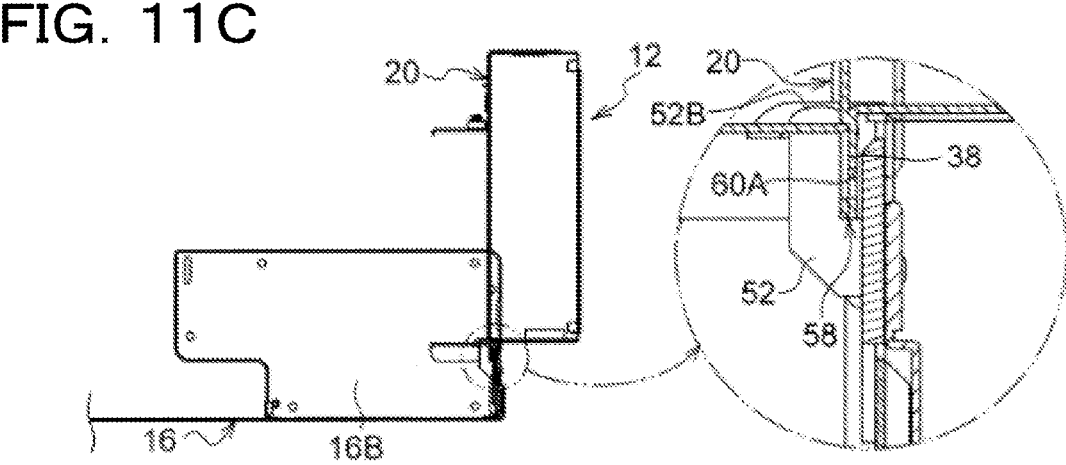
FIG. 11C is a C-C line cross sectional view when a mounting member is at an erected position.

FIG. 11A is an A-A line cross sectional view when a mounting member is at an erected position. FIG. 11B is a B-B line cross sectional view when a mounting member is at an erected position. FIG. 11C is a C-C line cross sectional view when a mounting member is at an erected position. A-A line, B-B line, and C-C line are indicated in FIG. 5. As illustrated in FIGS. 11B and 11C, with the upper plate 38 inserted into the retaining part 58, the motion of the upper plate 38 in the width direction is restricted, so the rotation of the mounting member 20 is also suppressed. With the mounting member 20 at the erected position, a direction, indicated by the arrow M1, in which the upper plate 38 extends and a direction in which the upper plate 38 is inserted into the retaining part 58 are aligned with the displacement direction (downward direction) of the mounting member 20. The upper plate 38 may be an example of a retained member. The retaining part 58 and upper plate 38 may be an example of a rotation suppressing member.

At the top end of the guide piece 56, a guide edge 56A, which is shaped to be lowered from the side wall 16A side toward the inside in the width direction, is formed.

The upper plate 38 of the mounting member 20 has a non-contact concave part 60 at a position corresponding to the guide piece 56 in the front-and-rear direction. The non-contact concave part 60 is formed at a position at which the non-contact concave part 60 does not contact with the guide piece 56 as illustrated in FIG. 9C until the rotation angle reaches a certain angle, when the mounting member 20 is further rotated from the support cancel position toward the erected position.

When the rotation angle to the erected position of the mounting member 20 exceeds the above certain angle, the bottom edge 60A of the non-contact concave part 60 contacts with the guide edge 56A. When the mounting member 20 is further rotated toward the erected position, the bottom edge 60A slides downward and inside in the width direction along the guide edge 56A. Therefore, due to the rotation of the mounting member 20, the upper plate 38 is displaced downward while rotating and is guided to the retained position as indicated by the arrow M1 in FIG. 9C, and is guided to a retained position at which the upper plate 38 is retained by the retaining part 58. The contact position at which the upper plate 38 contacts with the guide edge 56A may be referred to as a guide start position. The guide piece 56 may be an example of a guide member.

When the cover 18 has been attached to the housing 14 as illustrated in FIG. 1, the cover 18 is removed from the housing 14. In a factory or the like where the computer body 12 is manufactured, operation of rotating the mounting member 20 may be performed in the housing 14 to which the cover 18 has not been attached.

When the mounting member 20 is at the falling position as illustrated in FIGS. 8A, 8B, and 8C, the upper plate 38 is supported by the curved support edge 52B (see FIGS. 8B and 8C). Therefore, a state is maintained in which the shaft hole 46 is positioned at the bottom of the vertical part 46B with respect to the shaft screw 48 (see FIG. 8A) and the shaft screw 48 is positioned at the bottom of the vertical part 46B.

To rotate the mounting member 20 to the erected position, the mounting member 20 is pulled up toward the erected position against the clamping force of the clamping part 50 to cancel the clamping.

When the mounting member 20 is rotated in the direction indicated by the arrow R1 toward the erected position, the curved support edge 52B supports the upper plate 38 and side plate 24 of the mounting member 20 from below until the mounting member 20 reaches the support cancel position (see FIGS. 9B and 9C). Since the upper plate 38 of the mounting member 20 slides on the curved support edge 52B, undesirable downward movement, for example, is suppressed during the rotation of the mounting member 20, enabling smooth rotation.

When the mounting member 20 is rotated toward the erected position and reaches the support cancel position, the curved support edge 52B enters the groove 24B and the support of the mounting member 20 by the curved support edge 52B is canceled (see FIGS. 10B and 10C). The clearance G (see FIG. 9A) is formed between the shaft screw 48 and the shaft hole 46. A clearance is also formed between the holding hole 32 and the bottom of the support shaft 44. Since the curved support edge 52B does not support the mounting member 20, the mounting member 20 is movable downward.

When the mounting member 20 is further rotated toward the erected position, since the non-contact concave part 60 is formed in the mounting member 20, the mounting member 20 (the bottom edge 60A of the non-contact concave part 60) does not interfere (contact) with the guide piece 56 until the mounting member 20 reaches the guide start position. For example, the rotation of the mounting member 20 may not be restricted by the guide piece 56 or undesirable resistance may not be generated in the rotation.

With the mounting member 20 at the guide start position, the upper plate 38 (the bottom edge 60A of the non-contact concave part 60) contacts with the guide piece 56. When the mounting member 20 is further rotated from the guide start position toward the erected position, due to the rotation of the mounting member 20, the upper plate 38 moves downward and inside in the width direction while rotating as indicated by the arrow M1 in FIG. 9C. Therefore, due to the rotation of the mounting member 20, the rotation center line C1 (see FIG. 5) of the mounting member 20 moves downward and inside in the width direction, and the upper plate 38 is guided to the retained position at which it is retained by the retaining part 58.

The mounting member 20 reaches the erected position as illustrated in FIGS. 11A, 11B, and 11C. At that time, the upper plate 38 is retained in the retaining part 58 (see FIGS. 11B and 11C). Thus, the rotation of the mounting member 20 is suppressed. Even if, for example, the force with which the mounting member 20 is supported is removed, undesirable falling to the falling position of the mounting member 20 is suppressed.

Due to the rotation of the mounting member 20, the rotation center line C1 is displaced. Due to the displacement of the mounting member 20, part (the upper plate 38) of the mounting member 20 may be retained at the erected position of the mounting member 20 and the rotation of the mounting member 20 may be suppressed. Special operation to suppress the rotation of the mounting member 20 may not be desired. Workability may be improved.

A new member, for example, a member placed between the mounting member 20 and the housing 14 is not desired to suppress the rotation of the mounting member 20 at the erected position and the number of parts is reduced.

Since the shaft hole 46 and holding hole 34 are substantially L-shaped, when the mounting member 20 moves downward, the upper plate 38 is retained in the retaining part 58, and the rotation of the mounting member 20 is suppressed. Since part of the mounting member 20 is retained and its rotation is suppressed, the pull-up of the mounting member 20 or its movement in the width direction, for example, may not be desired. Workability may be improved.

The holding hole 32 and shaft hole 46 are substantially L-shaped. When the mounting member 20 is rotated from the guide start position to the falling position, the bottom edge 60A of the upper plate 38 is guided by the guide edge 56A, and the upper plate 38 is displaced in a direction indicated by the arrow M1 (see FIG. 9C). Due to the displacement of the upper plate 38 in a direction in which it is drawn toward the inside in the width direction, undesirable interference with the housing 14 (the side wall 16A, the fixing piece 26, and the like) may be suppressed during the rotation of portions of the mounting member 20 other than the bottom edge 60A. In a structure in which, for example, the housing 14 is made small and various members are placed therein at a high density, interference between the mounting member 20 and the various members may be suppressed during the rotation of the mounting member 20, the mounting member 20 may be held at the erected position, and the falling of the mounting member 20 may be suppressed.

In a simplified structure in which the holding hole 34 is formed in the housing 14 and the shaft hole 46 is formed in the mounting member 20, the mounting member 20 may be capable of moving in a direction crossing (in the above example, orthogonal to) the rotation center line C1 with the mounting member 20 at the erected position.

When the upper plate 38 is retained in the retaining part 58, the direction in which the mounting member 20 is displaced and the direction in which the upper plate 38 extends from the mounting member 20 (the direction indicated by the arrow M1) may be the same as illustrated in FIGS. 11B and 11C. Since the upper plate 38 is retained, for example, in the retaining part 58 so as to be inserted into the retaining part 58 along the direction in which the upper plate 38 extends, the width of the retaining part 58, for example, may be reduced within a range in which the upper plate 38 is able to be retained, for example, to about the thickness of the upper plate 38.

When the mounting member 20 is at the erected position, the mounted member 62 may be attached to or removed from the attachment unit 22 of the mounting member 20. Since the mounting member 20 is maintained at the erected position, attachment and removal may be easy.

Figure 12:
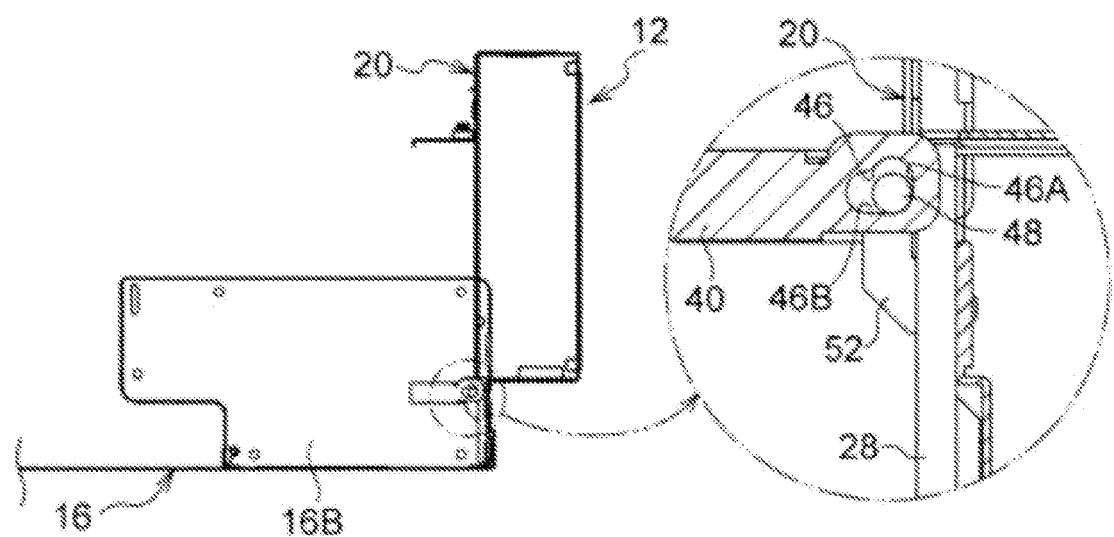
FIG. 12 is an A-A line cross sectional view when a mounting member returns from an erected position to a falling position.

When the mounting member 20 is returned from the erected position to the falling position, the mounting member 20 at the erected position is displaced upward as illustrated in FIG. 12. Due to this displacement, the upper plate 38 is no longer retained in the retaining part 58. The mounting member 20 is rotated from the falling position to the erected position. Since the mounting member 20, for example, the upper plate 38 and side plate 24 are supported by the curved support edge 52B of the support piece 52, the mounting member 20 may be stably rotated.

The rotation center line C1 of the mounting member 20 positioned at the erected position is displaced downward and inside of the falling position in the width direction, for example, in a direction crossing the rotation center line C1. When part of the mounting member 20 is held, the displacement direction of the mounting member 20 may not be a direction crossing the rotation center line C1. For example, at the erected position, the mounting member 20 may be displaced backward and a holding member that holds part of the mounting member 20 may be provided behind the mounting member 20. In this structure, a space in which the holding member is placed is formed behind the mounting member 20 in the housing 14. The space behind the mounting member 20 may be used to place various members and wires of the computer body 12. When the mounting member 20 is displaced in a direction crossing (particularly, orthogonal to) the rotation center line C1, since the mounting member 20 is not displaced backward, the space behind the mounting member 20 may be used to place other members.

The support piece 52 (support member) and guide piece 56 (guide member) may be part of one fixing piece 26. Alternatively, the support member and guide member may be separately provided. If the support member and guide member are formed as part of one fixing piece 26, the support member and guide member are integrated, so the number of parts may be reduced. If the fixing piece 26 is secured when it is secured to the housing 14, the support member and guide member are also secured at the same time, so workability may be improved.

Since the support piece 52 (support member) and guide piece 56 (guide member) are formed as part of the fixing piece 26 by bending a single metal plate, the support member and guide member may not be integrated in a later process.

The rotation of the mounting member 20 may be suppressed by retaining part of the mounting member 20 (the upper plate 38) by the retaining part 58 (the guide piece 56 and support piece 52). For example, when the mounting member 20 is at the erected position, part of the mounting member 20 may be engaged with the housing 14 to suppress the rotation of the mounting member 20. When the rotation of the mounting member 20 is suppressed by retaining part of the mounting member 20 (the upper plate 38), a member for engagement may not be used. The structure may be simplified.

With the mounting member 20 at the erected position, the whole of the mounting member 20 in the thickness direction, rather than part (the upper plate 38) of the mounting member 20, may be retained. In a structure in which part (the upper plate 38) of the mounting member 20 is retained, the retaining part 58 may be made small.

An engaged part that an engaging part engages may not be provided on the mounting member 20. The structure of the mounting member 20 may be simplified by forming a retained member (the upper plate 38) retained in the retaining part 58.

The mounted member 62 may be the optical disk drive 62A or hard disk drive 62B. Other various mounted members 62 attached and mounted in the housing 14 are also allowed.

An electronic apparatus may be the computer body 12; may be, for example, a computer with an integrated display unit. An electronic apparatus may be a computer; for example, a processing unit, or a recording and reproducing unit that handles electronic information (including video, images, voice data, and the like).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An electronic apparatus comprising:
   a housing;
   a mounting member pivotably mounted to the housing;
   a displacing member including an L-shaped shaft hole formed in at least one of the mounting member and the housing member, and a shaft located in the shaft hole, the displacing member be configured such that the shaft is located at a first position of the L-shaped shaft hole when the mounting member is in a falling position and the shaft is located at a second position of the L-shaped shaft hole different from the first position when the mounting member is in an erected position; and
   a rotation suppressing member configured to hold the mounting member when the mounting member is displaced, and suppress the rotation of the mounting member, the rotation suppressing member including at least one support member configured to secure an upper plate portion of the mounting member when the mounting member is in the erected position, the support member including a wide portion extending from a sidewall of the housing and a curved support edge curved to have an upward convex.

2. The electronic apparatus according to claim 1, wherein the rotation suppressing member includes a retaining part, provided in the housing, configured to retain at least part of the mounting member.

3. The electronic apparatus according to claim 2, wherein the rotation suppressing member further comprises at least one guide piece formed on a sidewall of the housing and configured to guide the upper plate portion of the mounting member into the retaining part.

4. The electronic apparatus according to claim 3, wherein the retaining part is configured to be located between the wide portion of the support member and the guide piece when the mounting member is in the erected position.

5. The electronic apparatus according to claim 4, wherein a direction in which the mounting member is displaced when the retained part is retained by the retaining part and a direction in which the retained part extends from the mounting member are substantially the same.

6. The electronic apparatus according to claim 5, wherein the rotation suppressing member is configured such that the rotation of the mounting member is suppressed based on a downward displacement of the mounting member.

7. The electronic apparatus according to claim 3, further comprising, a fixing piece secured to the housing and comprising the at least one support member and at least one guide piece.

8. The electronic apparatus according to claim 7, wherein the at least one support member and the at least one guide piece of the fixing piece are formed of a single metal plate.

9. The electronic apparatus according to claim 1, wherein: the at least one support member is configured to support the mounting member from the falling position to an intermediate position in a rotation to the erected position.

10. The electronic apparatus according to claim 1, wherein a width direction of the mounting member is substantially parallel to a bottom surface of the housing and the mounting member is located substantially within the housing in the falling position and wherein the width direction of the mounting member is substantially perpendicular to the bottom surface of the housing and the mounting member is located substantially outside of the housing in the erected position.

11. The electronic apparatus according to claim 1, further comprising, an interference suppressing part provided on at least one of the mounting member and the housing and configured to suppress an interference between the mounting member and the housing when the mounting member is rotated.

12. The electronic apparatus according to claim 1, wherein the mounting member is configured so as to be displaced in a direction away from a component in the housing when the mounting member is rotated to the erected position.

13. A member rotating operation method comprising:
   rotating a mounting member mounted on a housing of an electronic apparatus;
   displacing the mounting member with respect to the housing from a falling position to an erected position or from the erected position to the falling position by repositioning a shaft forming in either the mounting member or the housing within an L-shaped hole formed in either the mounting member or the housing;
   guiding, by a guide piece, an upper plate portion of the mounting member from a guide start position in which the upper plate contacts with an edge of the guide piece to an end position in which the upper plate does not contacts with the guide piece in a retaining part which is formed between the guide piece and a support member configured to support the upper plate portion; and holding, in the erected position, the mounting member in the retaining part.

14. The member rotating operation method according to claim 13, wherein a mounted component is attached to or removed from the mounting member when the mounting member is in the erected position.

15. An electronic apparatus comprising:

a housing;

a mounting member pivotably mounted to the housing;

a displacing member including an L-shaped shaft hole formed in at least one of the mounting member and the housing member, and a shaft located in the shaft hole, the displacing member be configured such that the shaft is located at a first position of the L-shaped shaft hole when the mounting member is in a falling position and the shaft is located at a second position of the L-shaped shaft hole different from the first position when the mounting member is in an erected position; and rotation suppressing member configured to hold the mounting member when the mounting member is displaced and including a support member, provided on a sidewall of the housing, configured to secure an upper plate portion of the mounting member and a guide piece, provided on the sidewall of the housing, configured to guide the upper plate portion into a retaining part which is formed between the support member and the guide piece, the support member projecting from the sidewall of the housing further than the guide piece so as to form the retaining part.

\* \* \* \* \*